(12) United States Patent
Schelhas

(10) Patent No.: US 7,278,402 B2
(45) Date of Patent: Oct. 9, 2007

(54) DEVICE FOR CONVEYING FUEL OUT OF A TANK AND TO A COMBUSTION ENGINE

(75) Inventor: Peter Schelhas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/568,813

(22) PCT Filed: Aug. 5, 2004

(86) PCT No.: PCT/DE2004/001759

§ 371 (c)(1),
(2), (4) Date: Feb. 21, 2006

(87) PCT Pub. No.: WO2005/017346

PCT Pub. Date: Feb. 24, 2005

(65) Prior Publication Data

US 2006/0225711 A1 Oct. 12, 2006

(30) Foreign Application Priority Data

Aug. 18, 2003 (DE) ................................ 103 37 850

(51) Int. Cl.
*F02M 59/46* (2006.01)
(52) U.S. Cl. .................... 123/467; 123/446; 137/116.3
(58) Field of Classification Search ................ 123/447, 123/467, 514, 456, 457, 446; 137/115.27, 137/514.5, 509, 510, 116, 116.3, 116.5
See application file for complete search history.

(56) References Cited

U.S. PATENT DOCUMENTS

| | | | |
|---|---|---|---|
| 3,606,909 A * | 9/1971 | Kowalski et al. ........ | 137/116.3 |
| 3,656,508 A * | 4/1972 | Boychuk et al. ............ | 137/495 |
| 5,271,428 A * | 12/1993 | Dunn et al. ................. | 137/509 |
| 5,339,785 A | 8/1994 | Wilksch | |
| 5,398,655 A | 3/1995 | Tuckey | |
| 5,458,104 A | 10/1995 | Tuckey | |
| 5,477,829 A * | 12/1995 | Hassinger et al. .......... | 123/467 |
| 5,509,390 A | 4/1996 | Tuckey | |
| 5,551,404 A | 9/1996 | Bauerle et al. | |
| 5,579,739 A | 12/1996 | Tuckey et al. | |
| 5,590,631 A | 1/1997 | Tuckey | |
| 5,727,529 A | 3/1998 | Tuckey | |
| 5,842,455 A * | 12/1998 | Tuckey et al. ............. | 123/514 |
| 5,873,349 A * | 2/1999 | Tuckey et al. ............. | 123/514 |
| 5,967,120 A * | 10/1999 | Blanton et al. ............. | 123/467 |
| 6,918,381 B2 * | 7/2005 | Palvolgyi ................... | 123/514 |
| 6,988,488 B2 * | 1/2006 | Pursifull et al. ............ | 123/467 |
| 7,066,152 B2 * | 6/2006 | Stroia et al. ................ | 123/467 |
| 2004/0250795 A1 * | 12/2004 | Stroia et al. ................ | 123/447 |

\* cited by examiner

*Primary Examiner*—Carl S. Miller
(74) *Attorney, Agent, or Firm*—Ronald E. Greigg

(57) ABSTRACT

A diaphragm valve having a first chamber and a second chamber, which is separated from the first chamber by means of a valve member which cooperates with a valve seat. A first connecting conduit situated in the vicinity of the valve seat feeds into the first chamber. To enable the diaphragm valve to be used as a pressure control valve, the valve member has a through conduit that connects the first connecting conduit to the second chamber of the pressure control valve when the pressure control valve is closed.

8 Claims, 1 Drawing Sheet ded by the fuel-supply pump.
DEVICE FOR CONVEYING FUEL OUT OF A TANK AND TO A COMBUSTION ENGINE

CROSS-REFERENCE TO RELATED APPLICATIONS

This application is a 35 USC 371 application of PCT/DE 2004/001759 filed on Aug. 5, 2004.

BACKGROUND OF THE INVENTION

1. Field of the Invention

The present invention is directed to an improved fuel delivery device for delivering fuel from a reservoir to an internal combustion engine.

2. Description of the Prior Art

A device for delivering fuel is already known from DE 195 27 134 A1, in which a check valve and a pressure outlet valve are situated parallel to each other in a valve housing; the flow travels through the pressure outlet valve in the opposite direction from that of the check valve. When a fuel-supply pump is operating, it delivers fuel via the check valve into a fuel rail; once the fuel-supply pump has been switched off, the check valve maintains the pressure in the fuel rail. If a pressure increase in the fuel rail occurs due to a heating of the device after the engine is switched off, then the pressure outlet valve opens, permitting fuel to flow back into the tank. The disadvantage to this is the insufficient control precision, particularly at low volumetric flows.

DE 197 05 405 A1 has disclosed a diaphragm valve with a high degree of control precision. The diaphragm valve has a first chamber and a second chamber, which is separated from the first chamber by means of a valve member; the valve member cooperates with a valve seat; and a first connecting conduit in the vicinity of the valve seat feeds into the first chamber. The disadvantage here is that the diaphragm valve cannot be used as a pressure outlet valve without being modified because it opens toward the fuel rail in the same was as the check valve during operation of the fuel-supply pump.

SUMMARY AND ADVANTAGES OF THE INVENTION

The device according to the present invention has the advantage over the prior art of achieving a simple improvement that allows the pressure regulator to be used as a pressure outlet valve by virtue of the fact that the valve member has a through conduit that connects the first connecting conduit to the second chamber when the pressure control valve is closed. Since the same pressure prevails in the second chamber of the pressure control valve as in the first chamber when the pressure control valve is closed and the fuel-supply pump is operating, and since in addition, a spring element prestresses the valve member in the closing direction, the pressure control valve remains closed while the fuel-supply pump is operating, which differs from the prior art.

Advantageous modifications and improvements of the device disclosed. According to one advantageous embodiment, the pressure control valve is embodied in the form of a diaphragm valve since a diaphragm valve is able to achieve particularly advantageous regulating properties.

A spring element, which is contained in the second chamber and prestresses the valve member in the closing direction, can be used to set the predetermined opening pressure at which the pressure control valve opens, independent of a pressure generated by the fuel-supply pump.

It is also advantageous that the pressure control valve is situated parallel to a check valve since this permits an optimal regulation of the pressure in the fuel rail. In an advantageous exemplary embodiment, the check valve is situated in a third pressure line segment and the pressure control valve is situated in a fourth pressure line segment; the third pressure line segment permits a flow in the direction of the engine and the fourth pressure line segment permits a flow in the direction of the tank.

It is also advantageous if a protective filter is provided in the fourth pressure line segment, upstream of a second connecting conduit of the pressure control valve that feeds into the first chamber, since this protects the pressure control valve from dirt particles.

BRIEF DESCRIPTION OF THE DRAWING

An exemplary embodiment of the present invention is explained in greater detail herein below, in conjunction with the single drawing FIGURE which shows a device for delivering fuel, with a pressure control valve according to the present invention.

DESCRIPTION OF THE PREFERRED EMBODIMENT

Figure 1:
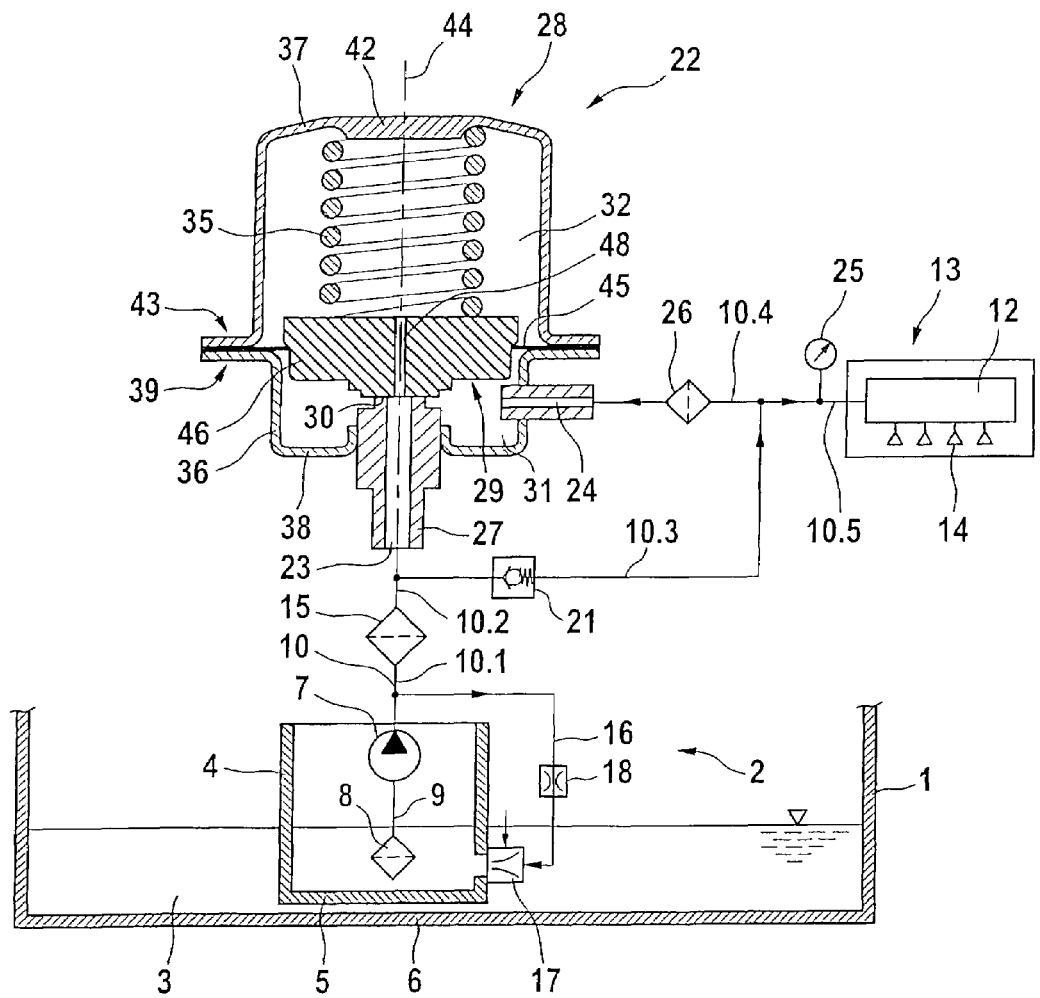

FIG. 1 shows a device for delivering fuel, with a pressure control valve according to the present invention.

The device has a fuel delivery module 2 situated in a tank 1. For example, a fuel 3 is stored in the tank 1.

The fuel delivery module 2 is comprised of a for example cup-shaped reservoir 4, which contains a fuel-supply pump 7 that draws fuel from the reservoir 4, for example via a filter 8 and an intake line 9, and delivers it at a higher pressure via a pressure line 10, for example to a fuel rail 12 of an internal combustion engine 13. The fuel rail 12 is connected to a number of injection valves 14, which inject the fuel into cylinders, not shown, of the engine 13. The downstream end of the pressure line 10, however, can also be connected to a high-pressure pump of a so-called gasoline direct injection system or of a diesel injection system, which delivers the fuel at high pressure into the fuel rail and injects it by means of injection valves into cylinders of the engine 13.

The reservoir 4 stores enough fuel to assure a fuel supply of the internal combustion engine 13 by means of the fuel-supply pump 7 even if no fuel is being fed into the reservoir 4, for example during cornering and the associated sloshing movements of the fuel in the tank 1. The reservoir 4 is positioned with its cup bottom 5 close to a tank bottom 6 of the tank 1.

For example, the fuel-supply pump 7 is a flow-type pump that is driven electrically by an actuator, for example an armature of an electric motor.

The filter 8 protects the device downstream of the filter 8 from coarse dirt particles contained in the fuel.

For example, the pressure line 10 is provided with a main filter 15 that filters out fine dirt particles contained in the fuel.

Downstream of the fuel-supply pump 7 and upstream of the main filter 15, the pressure line 10 is provided with a drive line 16 that feeds via a suction jet pump 17 into the reservoir 4. The purpose of the suction jet pump 17 is to supply fuel from the tank 1 into the reservoir 4 so that the fuel-supply pump 7 does not suck the reservoir 4 dry. The drive line 16 can contain a throttle element 18 that limits the volumetric flow traveling through the drive line 16.

A suction jet pump is known, for example, from DE 198 56 298 C1, the content of which is expressly intended to constitute part of the disclosure of this application.

The pressure line 10 is comprised of a first pressure line segment 10.1 between the fuel-supply pump 7 and the main filter 15; a second pressure line segment 10.2 whose downstream end splits into two parallel pressure line segments that comprise a third pressure line segment 10.3 and fourth pressure line segment 10.4; and a fifth pressure line segment 10.5 situated downstream of the point at which the two parallel pressure line segments 10.3, and 10.4 rejoin.

For example, the third pressure line segment 10.3 contains a check valve 21 and the fourth pressure line segment 10.4 contains a pressure control valve 22 according to the present invention, which is equipped with a first connecting conduit 23 and a second connecting conduit 24. The first connecting conduit 23 is situated in a connection fitting 27. Upstream of the second connecting conduit 24, the fourth pressure line segment 10.4 contains, for example, a protective filter 26 to protect the pressure control valve 22 from dirt particles. For example, the protective filter has a mesh aperture of less than 60 micrometers.

The pressure line 10, for example in the fifth pressure line segment 10.5 or in the fuel rail 12, is provided with a pressure sensor 25 that detects the pressure in the pressure line 10 or the pressure rail 12.

The pressure control valve 22 according to the present invention has a valve housing 28 with a moving valve member 29 and a fixed valve seat 30, which is embodied on the connection fitting 27 and cooperates with the valve member 29. For example, the valve member 29 is embodied in the form of a diaphragm. The pressure control valve 22 has two adjoining chambers, a first chamber 31 and a second chamber 32 that are separated from each other by the valve member 29. The first connecting conduit 23 and the second connecting conduit 24 feed into the first chamber 31; the first connecting conduit 23 has its outlet situated in the vicinity of the valve seat 30. The second chamber 32 contains a spring element 35, for example a helical spring, which presses the valve member 29 against the valve seat 30 with a prestressing force acting in the closing direction. For example, one end of the spring element 35 rests against the second cup bottom 42 and the other end rests against the valve member 29.

For example, the valve housing 28 of the pressure control valve 22 has a first housing part 36 and a second housing part 37. The first housing part 36 and the second housing part 37 are each embodied, for example, in a cup-shaped form. The first housing part 36 has a first cup bottom 38 and on the side oriented away from the first cup bottom 38, has a for example annular first shoulder or flange 39. The second housing part 37 has the second cup bottom 42 and on the side oriented away from the second cup bottom 42, has a for example annular second shoulder or flange 43. The first housing part 36 and the second housing part 37 rest against each other respectively with the first shoulder 39 and the second shoulder 43, enclosing an inner space that contains the first chamber 31 and the second chamber 32. The first housing part 36 and the second housing part 37 are attached to each other for example by means of welding, clipping, crimping, gluing, or clamping.

For example, the pressure control valve 22 is a diaphragm valve whose diaphragm 45 constitutes part of the valve member 29. For example, the diaphragm 45 is clamped between the first shoulder 39 and the second shoulder 43 and seals the first chamber 31 in relation to the second chamber 32 around the outside. In the middle region, the diaphragm 45 supports a sealing element 46 that cooperates with the valve seat 30 and constitutes another part of valve member 29.

The valve seat 30 is situated on the first cup bottom 38 of the first housing part 36, for example centrally in relation to a valve axis 44. The first connecting conduit 23 is provided in the vicinity of the valve seat 30, for example concentric valve axis 44, and the second connecting conduit 24 is provided, for example, at the circumference of the first housing part 36.

For example, the spring element 35 and the valve member 29 are situated concentric to the valve axis 44.

When the pressure control valve 22 is closed, the valve member 29 rests with the sealing element 46 snugly against the valve seat 30, thus closing the first connecting conduit 23. When the pressure control valve 22 is open, the sealing element 46 has lifted away from the valve seat 30, thus opening the first connecting conduit 23 so that fuel can flow via the second connecting conduit 24 and first chamber 31, into the first connecting conduit 23.

According to the present invention, the sealing element 46 of the valve member 29 has a through conduit 48 concentric to the first connecting conduit 23; when the pressure control valve 22 is closed, this through conduit 48 connects the first connecting conduit 23 to the second chamber 32; when the pressure control valve 22 is open, connects the first connecting conduit 23 is connected to the first chamber 31 to the second chamber 32.

During operation of the fuel-supply pump 7, the fuel is supplied to the fuel rail 12 of the internal combustion engine 13 via the filter 8, the intake line 9, the fuel-supply pump 7, the first pressure line segment 10.1, the main filter 15, the second pressure line segment 10.2, the third pressure line segment 10.3 equipped with the check valve 21, and the fifth pressure line segment 10.5. When the fuel-supply pump 7 is switched off, the check valve 21 prevents fuel from flowing out of the pressure line 10 downstream of the check valve 21 via the pressure line 10 back toward the upstream side of the check valve 21 and into the reservoir 4. As a result, the pressure that the fuel-supply pump 7 has built up in the pressure line 10 downstream of the check valve 21 and in the fuel rail 12 is maintained at least for a certain amount of time even when the fuel-supply pump 7 is switched off.

The second chamber 32 of the pressure control valve 22 is filled with fuel via the through conduit 48 and is embodied as sealed in relation to the environment.

During operation of the fuel-supply pump 7, the pressure control valve 22 is closed since at least approximately the pressure generated by the fuel-supply pump 7 prevails both in the first chamber 31, via the second connecting conduit 24, and in the second chamber 32, via the first connecting conduit 23 and the through conduit 48, so that the compressive forces exerted by fuel pressure on the side of the valve member 29 oriented toward the second chamber 32 are at least approximately canceled out by the compressive forces exerted by fuel pressure on the side of the valve member 29 oriented toward the first chamber 31. As a result, the opening pressure at which the pressure control valve 22 opens is independent of the pressure generated by the fuel-supply pump 7. In addition, the spring element 35 prestresses the valve member 29 in the closing direction so that the pressure control valve 22 remains reliably closed during operation of the fuel-supply pump 7.

The purpose of the through conduit 48 is to connect the second chamber 32 of the pressure control valve 22 to the pressure line 10 so that the pressure of the fuel supply pump 7 travels into the second chamber 32 via the pressure line 10.1, 10.2, 10.4, the first connecting conduit 23, and the through conduit 48.

When the fuel-supply pump 7 is switched off, the pressure in the pressure line 10 between the fuel-supply pump 7 and the check valve 21 and between the fuel-supply pump 7 and the pressure control valve 22 drops almost abruptly to atmospheric pressure. Thanks to the hydraulic connection to the fuel-supply pump 7 via the through conduit 48 and the first connecting conduit, the pressure in the second chamber 32 of the pressure control valve 22 is also only at atmospheric pressure, whereas the pressure in the first chamber 31 is maintained due to the hydraulic connection to the fuel rail 12. Because of the pressure difference between the first chamber 31 and the second chamber 32, a resulting compressive force acts on the valve member 29 counter to the spring force of the spring element 35. If the resulting compressive force is greater than the spring force of the spring element 35, for example due to a pressure increase in the fuel rail 12, then the pressure control valve 22 opens.

The spring element 35 is designed so that the valve member 29 lifts away from the valve seat 30 and thus opens the pressure control valve when the pressure in the fuel rail 12 or the pressure line 10 downstream of the check valve 21 reaches or exceeds a predetermined opening pressure.

A pressure increase in the fuel rail 12 and in the pressure line 10 downstream of the check valve 21 occurs, for example, during overrunning of the engine or in a so-called hot parking phase in which after being switched off, the engine imparts a large amount of heat to an engine compartment surrounding the engine, as a result of which the fuel rail 12 is heated as well. The temperature increase in the fuel rail 12 causes a heating of the fuel and therefore a pressure increase in the fuel rail 12 and in the pressure line downstream of the check valve 21.

The open pressure control valve 22 allows fuel to flow back into the reservoir 4 via the fourth pressure line segment 10.4, the second connecting conduit 24, the first chamber 31, the first connecting conduit 23, the second pressure line segment 10.2, the main filter 15, the first pressure line segment 10.1, the fuel-supply pump 7, the intake line 9, and the filter 8. However, instead of flowing back into the reservoir 4 via the fuel-supply pump 7, the intake line 9, and the filter 8, the fuel can also flow back into the reservoir 4 via the drive line 16, the throttle 18, and the suction jet pump 17.

The pressure control valve 22 thus protects the pressure line 10 and the fuel rail from an impermissibly excessive pressure that could also damage the injection valves 14 and seals.

Particularly at low volumetric flows, the pressure control valve 22 according to present invention has a higher degree of control precision and a more precise opening behavior than pressure control valves according to the prior art since the pressure acting on the valve member 29 via the first connecting conduit 23 acts not only on the small area of the valve member 29 that is oriented toward and contiguous with the first connecting conduit 23, but also on the entire area of the valve member 29 oriented away from the valve seat 30. As a result, particularly at low volumetric flows, the pressure control valve 22 has a more steeply sloped valve characteristic curve than the ones according to the prior art; the valve characteristic curve represents the pressure differential acting on the pressure control valve 22, plotted over the volumetric flow through the pressure control valve 22. A pressure increase in the second connecting conduit 24 therefore yields a smaller increase in the volumetric flow than in the prior art.

The foregoing relates to preferred exemplary embodiment of the invention, it being understood that other variants and embodiments thereof are possible within the spirit and scope of the invention, the latter being defined by the appended claims.

The invention claimed is:

1. In a device for delivering fuel from a tank to an internal combustion engine, equipped with a pressure control valve that has a first chamber and a second chamber, which is separated from the first chamber by means of a valve member; the valve member cooperates with a valve seat; and a first connecting conduit for connection to a fuel pressure line situated in the vicinity of the valve seat feeds into the first chamber when the pressure control valve is open, with a fuel pressure line delivering fuel to the internal combustion engine, the pressure line comprising two parallel pressure line segments, wherein the first segment comprises a check valve and the other segment comprises the pressure control valve, wherein the first connecting conduit of the pressure control valve is connected with the pressure line upstream of the check valve and a second connecting conduit of the pressure control valve is connected with the pressure line downstream of the check valve the improvement wherein the valve member (29) comprises a through conduit (48) connecting the first connecting conduit (23) to the second chamber (32) when the pressure control valve (22) is closed.

2. The device according to claim 1, wherein the valve member (29) comprises a diaphragm (45).

3. The device according to claim 1, wherein the second chamber (32) is embodied as sealed in relation to the atmosphere.

4. The device according to claim 1, wherein the second chamber (32) contains a spring element (35) that prestresses the valve member (29) in the closing direction.

5. The device according to claim 1, wherein the pressure control valve (22) is connected parallel to a check valve (21).

6. The device according to claim 5, wherein the check valve (21) is connected in a third pressure line segment (10.3) and pressure control valve (22) is connected in a fourth pressure line segment (10.4); the third pressure line segment (10.3) permitting a flow in the direction of the engine (13) and the fourth pressure line segment (10.4) permitting a flow in the direction of the tank (1).

7. The device according to claim 6, further comprising a protective filter (26) connected in the fourth pressure line segment (10.4), upstream of a second connecting conduit (24) of the pressure control valve (22) that feeds into the first chamber (31).

8. The device according to claim 7, wherein the protective filter (26) has a mesh aperture of less than 60 micrometers.

* * * * *